S. STEVENS.
Tool Holder.
No. 30,548. Patented Oct. 30, 1860.
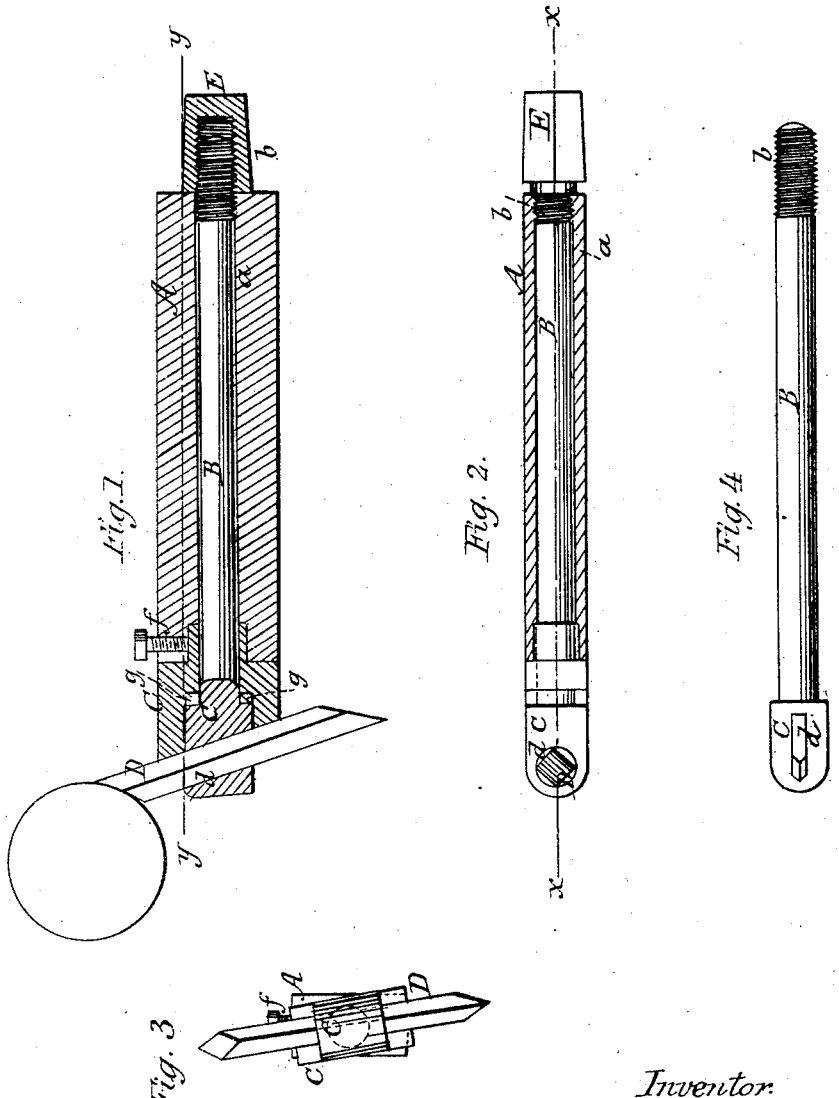
Witnesses.
J. W. Coombs.
C. W. Hughes.
Inventor.
Silas Stevens
per Munn & Co
Attys

UNITED STATES PATENT OFFICE.

SILAS STEVENS, OF WORCESTER, MASSACHUSETTS.

TOOL-HOLDER.

Specification of Letters Patent No. 30,548, dated October 30, 1860.

*To all whom it may concern:*

Be it known that I, SILAS STEVENS, of Worcester, in the county of Worcester and State of Massachusetts, have invented a new and Improved Tool-Holding Device for Lathes and Planes; and I do hereby declare that the following is a full, clear, and exact description of the same, reference being had to the annexed drawings, making a part of this specification, in which—

Figure 1, is a longitudinal central section of my invention, taken in the plane $x$, $x$, Fig. 2. Fig. 2 a longitudinal section of same taken in the line $y$, $y$, Fig. 1. Fig. 3 a front view of same. Fig. 4 a detached view of the arbor of same.

Similar letters of reference indicate corresponding parts in the several figures.

The object of this invention is to economize in the material or stock used in the construction of turning and planing tools and also to facilitate the construction of the same as well as the keeping of them in proper working order.

The turning and planing tools as hitherto made are forged in a peculiar irregular form in order to obtain a sufficient weight of metal, or, they may be described as being formed or forged at the end of a bar or shank, and the tools after being sharpened a few times require to be "upset" or drawn out in order to preserve the proper form. This is attended with considerable trouble, much stock is required in the making of the tools and much labor expended in keeping them in proper working order. These objections it is believed are fully obviated by my invention.

To enable those skilled in the art to fully understand and construct my invention I will proceed to describe it.

A, represents a rectangular metal bar which may be of any suitable dimensions with a circular hole $a$, made entirely through it longitudinally.

B, is a cylindrical rod which is fitted in the bar A, and has a screw thread $b$, cut on its back end, the screw projecting beyond the end of the bar A. The front end of the rod B, has a head $c$, formed on it and this head has a circular inclined hole $d$, made through it, see Figs. 1, and 2.

In the front end of the bar A, there is fitted a socket C. This socket may be described as being formed of a piece of metal corresponding in form to the bar A, and provided at its back end with a short tube $e$, which is fitted in the front end of the hole $a$, the latter being enlarged sufficiently at the point specified to receive the tube, the bore or internal diameter of the tube being equal to that of the hole $a$. In the front part of the bar A, there is a screw $f$, which bears on the tube $e$, and prevents its casual turning and consequently that of the socket C. The front end of the socket C, has a recess $g$, made in it to receive the head $c$, of the rod B.

D, is a tool which is made of equal dimensions throughout its entire length as shown clearly in Fig. 1. This tool is fitted in the hole $d$, of the head $c$, and is secured therein by screwing up a nut E, on the back end of the rod B.

In case the tool D, is not required to be in a perfectly vertical position but inclined as shown in Fig. 3, the screw $f$, being relaxed or unscrewed admits of the turning or adjustment of the socket C, as required.

From the above description it will be seen that the tool D, may be made and kept in proper working order with the greatest facility and that it may be detached from the rod B, by simply unscrewing the nut E. In case the tool is set at an angle as in Fig. 3, the angle may be retained, if the tool be removed for sharpening, by screwing tightly up the screw $f$, so as to prevent any casual turning of the socket C.

The hole in the head $c$, of the rod B, may be of any form according to the shape of the tool. In Fig. 4, the hole is shown of oblong form to receive a thin tool. The tool D, is about square in its transverse section— as shown in Fig. 2.

Having thus described my invention what I claim as new and desire to secure by Letters Patent is—

The arrangement of the adjustable head C, tool D and rod B with the hollow bar A, screw $f$ and nut E as and for the purposes herein shown and described.

SILAS STEVENS.

Witnesses:
RICHARD YEATON,
B. B. ADAMS.